(12) United States Patent
Sahlström et al.

(10) Patent No.: US 11,337,551 B2
(45) Date of Patent: May 24, 2022

(54) HEATING ELEMENT ASSEMBLY FOR COOKING APPARATUS

(71) Applicant: John Bean Technologies AB, Helsingborg (SE)

(72) Inventors: Karl Fredrik Johannes Sahlström, Landskrona (SE); Carl-Alvar Johansson, Örkelljunga (SE)

(73) Assignee: John Bean Technologies AB, Helsingborg (SE)

(*) Notice: Subject to any disclaimer, the term of this patent is extended or adjusted under 35 U.S.C. 154(b) by 273 days.

(21) Appl. No.: 15/891,168

(22) Filed: Feb. 7, 2018

(65) Prior Publication Data
US 2019/0239684 A1 Aug. 8, 2019

(51) Int. Cl.
*A47J 37/06* (2006.01)
*A47J 37/04* (2006.01)
(Continued)

(52) U.S. Cl.
CPC ......... *A47J 37/0611* (2013.01); *A47J 37/044* (2013.01); *A47J 37/045* (2013.01);
(Continued)

(58) Field of Classification Search
CPC . A47J 37/044–045; H05B 3/04; H05B 3/267; H05B 3/286; H05B 3/30;
(Continued)

(56) References Cited

U.S. PATENT DOCUMENTS

| 3,646,880 A | 3/1972 | Norris |
| 4,357,557 A * | 11/1982 | Inohara ............ H05B 33/04 313/232 |

(Continued)

FOREIGN PATENT DOCUMENTS

| DE | 92 17 626 U1 | 4/1993 |
| DE | 196 14 928 A1 | 10/1997 |

(Continued)

OTHER PUBLICATIONS

International Search Report and Written Opinion dated May 10, 2019, issued in corresponding International Application No. PCT/EP2019/052617, filed Feb. 4, 2019, 13 pages.

(Continued)

*Primary Examiner* — Matthew P Travers
(74) *Attorney, Agent, or Firm* — Christensen O'Connor Johnson Kindness PLLC (57) ABSTRACT

A belt cooking apparatus (10) includes a lower frame structure (12) and an upper frame structure (14) in registry with the lower frame structure. A lower cooking conveyor belt (16) is supported by the lower frame structure (12) and correspondingly an upper conveyor belt (18) is supported by the upper frame structure (14). Heating element assemblies (20) are mounted on the lower frame structure (12) just below the lower cooking belt (16) as well as on the upper frame structure (14) just above the upper cooking belt (18). Food products are cooked while positioned between the upper and lower moving cooking conveyor belts (16) and (18) by heat generated by the heating element assemblies (20) while being advanced by the conveyor belts.

23 Claims, 7 Drawing Sheets

(51) Int. Cl.
   *H05B 3/06* (2006.01)
   *H05B 3/28* (2006.01)
   *H05B 3/68* (2006.01)
   *H05B 3/04* (2006.01)
   *B65G 23/44* (2006.01)

(52) U.S. Cl.
   CPC ............ *A47J 37/049* (2013.01); *B65G 23/44* (2013.01); *H05B 3/06* (2013.01); *H05B 3/286* (2013.01); *H05B 3/68* (2013.01); *A47J 2037/0617* (2013.01); *H05B 3/04* (2013.01)

(58) Field of Classification Search
   CPC . H05B 3/68; H05B 3/688; H05B 3/72; H05B 2203/028; H05B 3/06; H05B 3/20; F24C 7/04–046; F24C 7/06; F24C 7/067; F24C 15/102; F27B 9/062–063; F27B 2009/3638; F27D 2099/0008; F27D 2099/0011; F27M 2001/08
   See application file for complete search history.

(56) References Cited

U.S. PATENT DOCUMENTS

| | | | |
|---|---|---|---|
| 4,444,094 A * | 4/1984 | Baker | A47J 37/044 |
| | | | 99/327 |
| 5,044,264 A | 9/1991 | Forney | |
| 6,138,554 A | 10/2000 | McFadden et al. | |
| 2014/0097176 A1 * | 4/2014 | Bobgan | H01L 21/68785 |
| | | | 219/452.12 |
| 2015/0122797 A1 | 5/2015 | Eggers | |
| 2017/0253142 A1 * | 9/2017 | Buckhout | B60L 58/27 |

FOREIGN PATENT DOCUMENTS

| | | |
|---|---|---|
| EP | 2 295 869 A2 | 3/2011 |
| GB | 313056 A | 8/1930 |
| JP | 2004-79247 A | 3/2004 |
| WO | 00/13466 A1 | 3/2000 |

OTHER PUBLICATIONS

Commumnication dated Mar. 2, 2022, issued in corresponding European Patent Application No. 19 705 460.4, filed Feb. 4, 2019, 7 pages.

* cited by examiner

HEATING ELEMENT ASSEMBLY FOR COOKING APPARATUS

BACKGROUND

In the industrial or commercial food production industry, various food products such as hamburger patties, chicken fillets, fish fillets, pancakes, and other food products are pre-cooked or fully cooked using a cooking apparatus known as a belt grill. The food products are transported between upper and lower moving conveyor belts. Cooking heat is conducted through the belts by heating elements positioned directly above the upper conveyor belt and below the lower conveyor belt. In the past, such heat sources have been in the form of heating platens. These are self-contained units having an exterior casing to house electrical resistance heating conductors or a heat exchanger, wherein hot heating fluid is circulated through the platen in heat transfer tubes or other devices.

It has been a challenge to design and construct the heating platens to produce the uniform level of heat about the entire area of the platen. In addition, it has been expensive and time consuming to construct the platens. Further, if the exterior platen casing is made from aluminum, mounting the heating coils or heating tubes within the casing may be reasonably accomplished. However, the exterior aluminum surface is not particularly robust, and is also subject to wear and tear and damage occurring due to scratches and gouges from scraping tools and brushes during the cleaning operation as well as due to exposure of the aluminum to strong cleaning agents.

If the platen casing is made from more durable material, such as stainless steel, the casing is better able to withstand damage from harsh cleaning agents as well as scratches and gouges from cleaning scrapers and brushes. However, mounting electrical resistance heating elements to the interior of the stainless steel casing has proven difficult. It is challenging to weld brackets or other items to the stainless steel to hold the heating coils or heating tubes in place within the stainless steel casing. In one effort to overcome this difficulty, grooves have been machined into the stainless steel into which the electrical resistance conductors are placed. However, the milling or the otherwise forming of such grooves into the interior of the stainless steel casing is time consuming and expensive.

The present disclosure seeks to provide a heating element assembly construction that addresses the shortcomings of prior art heating element assemblies used in belt cooking apparatus.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A heating element assembly is designed to be mounted adjacent one or more moving conveyor belts for heating work products/cooking food products that are carried on the conveyor. In some installations, upper and lower conveyors are provided with the work products/food products being carried between and by the upper and lower conveyors. One or more heating element assemblies may be mounted adjacent both the upper and lower conveyors to transfer heat from the heating element assemblies through the conveyor and to the work products/food products being carried thereon.

The heating element assemblies include first and second corrosion resistant heat conducting outer plates that sandwich therebetween one or more foil-based, nominally planar heating elements. A spacer structure is positioned between the first and second outer plates to form a space between the outer plates so as to accommodate the thickness of the one or more foil-based heating element assemblies. Fasteners or other means are used to draw the first and second outer plates towards each other and against the opposite faces of the foil-based heating elements, thereby to facilitate heat transfer from the heating elements to the outer plates.

In a further aspect of the present disclosure, the outer plates are substantially planar and may have a thickness of about 4 to 10 mm. In addition, the outer plates may be of different sizes, typically having a length in the range of about 900 to 1200 mm and a width in the range of about 400 to 700 mm. The width needs to be sufficient to extend across the width of conveyor(s).

In another aspect of the present disclosure, the outer plates are composed of stainless steel. A clamping load is applied to such plates to enhance the heat transfer from the foil-based heating elements to the outer plates. As one example, the clamping load can be achieved by the use of a plurality of fasteners that bear against the outer surface(s) of one or both of the outer plates. The fasteners can be adjusted thereby to selectively alter the clamping load applied to the outer plates.

In another aspect of the present disclosure, the spacer structure extends around the perimeter of the outer plates outward of the foil-based heating element(s). The seal can be built into the first and/or second outer plates or may be separate therefrom.

Further, a seal is used to seal the spacer structure from the exterior of the heating element assembly. The seal can be composed of various substances, including weldments, or an adhesive caulk. The thickness of the spacer structure corresponds to the thickness of the foil-based heating element. Also, the seal can serve as not only as the spacer structure, but also the clamping means.

A plurality of mounting brackets project from one or both of the outer plates for mounting the heating element assembly in desired position relative to a conveyor. The mounting brackets can be in the form of pins/assemblies that include studs that project laterally from one or both of the outer plates. The position of the mounting plates can be adjusted so that the heating element assembly is positioned at optimum location relative to the conveyor.

In a further aspect of the present disclosure, a heat conducting paste or a heat conducting adhesive may be applied between the foil-based heating element and one or both of the outer plates, thereby to enhance the heat transfer from the heating element to the outer plate(s).

In a further aspect of the present disclosure, the work product being thermally processed by the heat element assembly includes food products.

In a further aspect of the present disclosure, a cooking apparatus includes spaced-apart upper and lower conveyors with heating element assemblies positioned adjacent to the conveyors to transfer heat from the heating element to the conveyors and then to the work products being transported by the conveyors.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description and in the accompanying drawings, corresponding systems, assemblies, apparatus and units may be identified by the same part number, but with an alpha suffix. The descriptions of the parts/components of such systems assemblies, apparatus, and units that are the same or similar are not repeated so as to avoid redundancy in the present application.

In the present application and claims, references to "food," "food products," "food pieces," and "food items," are used interchangeably and are meant to include all manner of foods. Such foods may include, for example, meat, fish, poultry, fruits, vegetables, nuts, or other types of foods. Also, the present systems, apparatus and methods are directed to raw food products as well as partially and/or fully processed or cooked food products.

Further, the systems, apparatus and methods disclosed in the present application and defined in the present claims, though specifically applicable to food products or food items, may also be used outside of the food area. Accordingly, the present application and claims reference "work products" and "workpieces," which terms are synonymous with each other. It is to be understood that references to work products and workpieces also include food, food products, food pieces, and food items.

Figure 1:
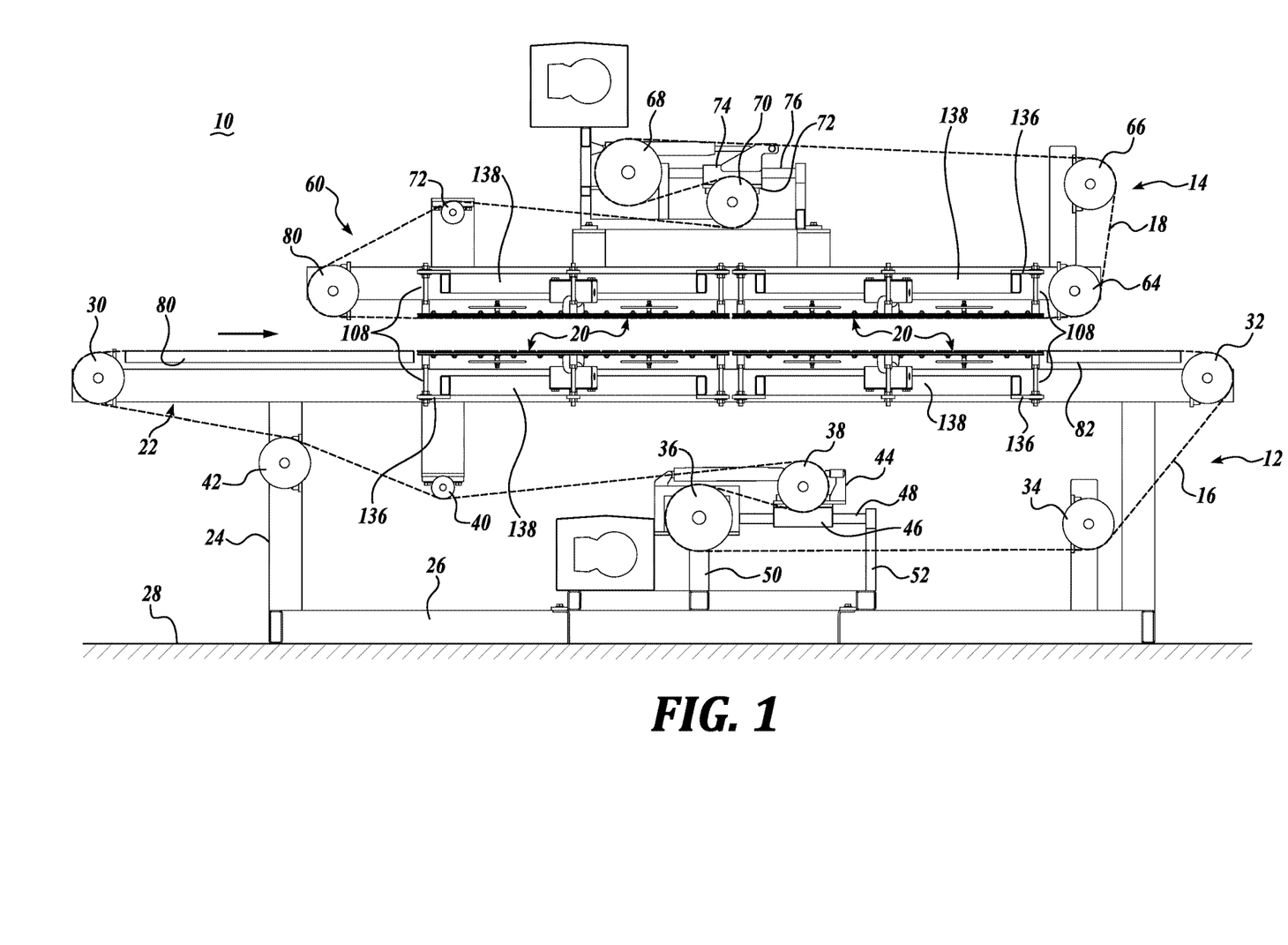
FIG. 1 is a side elevational view, partially in schematic, of a belt cooking apparatus utilizing heating elements of the present disclosure.

Referring initially to FIG. 1, a belt cooking apparatus 10 is illustrated as including a lower frame structure 12 and an upper frame structure 14 in registry with the lower frame structure 12. A lower cooking conveyor belt 16 is supported by the lower frame structure 12, and correspondingly an upper cooking conveyor belt 18 is supported by the upper frame structure 14. Heating element assemblies 20 are mounted on the lower frame structure 12 just below the lower cooking belt 16 as well as on the upper frame structure 14 just above the upper cooking belt 18. Food products to be thermally treated (cooked) are disposed between the upper and lower moving cooking conveyor belts 16 and 18 and are heated by the heating element assemblies 20 while being advanced by the conveyor belts.

Next describing the foregoing basic components of the belt cooking apparatus 10 in more detail, referring specifically to FIG. 1, the bottom or lower frame structure 12 includes a bed frame 22 supported by legs or posts 24 extending downwardly from the bed to a base 26 disposed above the floor 28 with feet or pads, not shown, lying on the floor. At the ends of the lower bed frame 22, the lower conveyor belt 16 is trained around an end roller 30 at the input end of the apparatus 10 and a second end roller 32 at the opposite end of the lower bed frame 22. From the second end roller 32, the lower conveyor belt 16 travels back to the input end roller 30 beneath the lower bed frame 22 by first extending about roller 34 located below the lower bed frame 22 near the output end of the apparatus 10. The lower conveyor belt 16 then travels generally horizontally to extend around a wrap roller 36 disposed generally centrally beneath the lower bed frame 22 and then around a drive roller 38. From the drive roller 38, the lower conveyor belt 16 presses against the lower surface of a first directional roller 40 and then the upper surface of a second directional roller 42. The drive roller 38 is powered by a motor 44, with the motor and drive roller both mounted on a carriage 46 that rides along a tubular slideway 48. The position of the carriage 46 on the tubular slideway 48 can be adjusted so as to impose a desired tension level on the lower conveyor belt 16. As shown in FIG. 1, the slideway 48 is supported beneath the lower frame structure 12 and above the frame base 26 by legs 50 and 52.

The upper frame structure 14 includes an upper bed frame 60 which is supported above the lower bed frame 22 by mounting on the lower frame structure 12 or by being free standing, as desired. The upper conveyor belt 18 is trained around end rollers 62 and 64 rotatably mounted at the opposite ends of the upper bed frame 60. From the end roller 64, upper conveyor belt 18 extends up and around an upper roller 66 and then horizontally to the upper side of wrap roller 68 and then around a drive roller 70. From the drive roller 70, the upper conveyor belt 18 extends around the upper side of a directional roller 72 and then to entrance end roller 62. The upper conveyor belt 18 is driven by a drive system similar to that used to drive roller belt 16. In this regard, the drive roller 70 is powered by a motor 72, with both the drive roller 70 and motor 72 suspended from the underside of a carriage 74. The carriage 74 is movable along a tubular slideway 76. The tension in upper conveyor belt 18 may be adjusted by adjusting the position of the carriage 74 along the slideway 76.

The upper run of lower cooking belt 16 rides directly on the upper surfaces of two end-to-end cooking (heating) element assemblies 20 located intermediate the ends of the lower bed frame 22. Between the inlet end roller 30 and the first heating element assembly 20, the lower conveyor belt 16 is supported by a gap plate 80 having its upper surface substantially coplanar with the upper surfaces of the heating element assemblies 20. At the opposite end of the lower bed frame 22, a second gap plate 82 supports the lower conveyor belt 16 between the end of the adjacent heating element assembly 20 and the end roller 32. The top surface gap plate 82 is also substantially coplanar with the upper surfaces of heating element assemblies 20.

Two heating element assemblies 20 are illustrated in FIG. 1 as mounted end-to-end on lower frame structure 12 intermediate the ends of the lower bed frame 22. Likewise, two heating element assemblies 20 are mounted end-to-end on the upper frame structure 14 intermediate the ends of the upper bed frame 60 and in substantial registry with the heating element assemblies 20 mounted on the lower bed frame 22.

The construction of exemplary embodiments of heating element assemblies 20 are shown in FIGS. 2-7B. The heating element assemblies 20 in basic form are composed of substantially planar outer plates 100 and 102, which sandwich therebetween one or more thin, foil-based heating elements 104. A spacer/perimeter frame 106 extends around the perimeter of the heating elements 104 to define the space or gap for the heating element assemblies 20. Mounting brackets (pin assemblies) 108 are employed to mount the heating element assemblies 20 to the frame structures 12 and 14.

The outer plates 100 and 102 are shown as being in the form of planar rectangles. The outer plates are composed of a durable, corrosion-resistant, highly heat conductive material, such as stainless steel. In one specific form, the stainless steel may consist of austenitic-ferritic stainless steel, which is highly corrosion resistant, very durable, and of high structure strength.

The outer plates 100 and 102 can be formed in a range of thicknesses as well as a range of widths and lengths. For example, the thickness of the outer plates 100 and 102 may range from about 4 to 10 mm, but other thicknesses are also possible. In terms of size, the outer plates 100 and 102 may be in a width range of about 400 to 700 mm and a length range of from about 900 to 1200 mm. Of course, other widths and lengths can be employed for the outer plates. For example, the size of the outer plates may be selected based on the width of the conveyor belts 16 and 18. In this regard, the width of the outer plates needs to be sufficient to span the width of the conveyor belts.

Heat for the heating element assembly 20 is generated/provided by the foil-based heating elements 104. Such heating elements are very thin and produce a high level of heat substantially uniformly about the entire area of the heating elements.

Foil-based heating elements are articles of commerce. In one form, such heating elements are composed of an etched foil center 104A layer sandwiched between outer layers of mica or similar material 104B. Such heating elements are capable of generating temperatures of up to 600° C. and having a thermal conductivity of 100° C. W/(m×k). Such heating elements may be powered by either alternating or direct current, and if alternating current, single or three phase. As one non-limiting example, the foil-based heating elements 104 may be powered by alternating current at about 400 volts at about 50 Hz. As other power parameters, the alternating current can be at 460 volts or 575 volts and at about 60 Hz. The voltage level can be selected based on the desired heat output desired from the heating element and/or based on the voltage and other characteristics/parameters of the local available electrical supply.

Electrical supply to the heating element is provided to a junction box 110 mounted on the outer surface of plate 100. Conduits 112 encase electrical lines leading from the junction box 110 to connector locations 114 of outer plates 100 and 102 of foil-based heating element 104, see FIG. 6.

The foil element of the heating element 104 can be etched to create a desired heating pattern in the foil. Since the goal is to achieve substantially even heating about the entire area of the heating element assembly 20, the etching pattern used for the heating elements 104 can be substantially straightforward, for example, arranged in rows along the length or width of the heating elements 104. Also, the density of the heating pattern in the foil can be designed to produce a desired level of heat from the heating elements.

Figure 6:
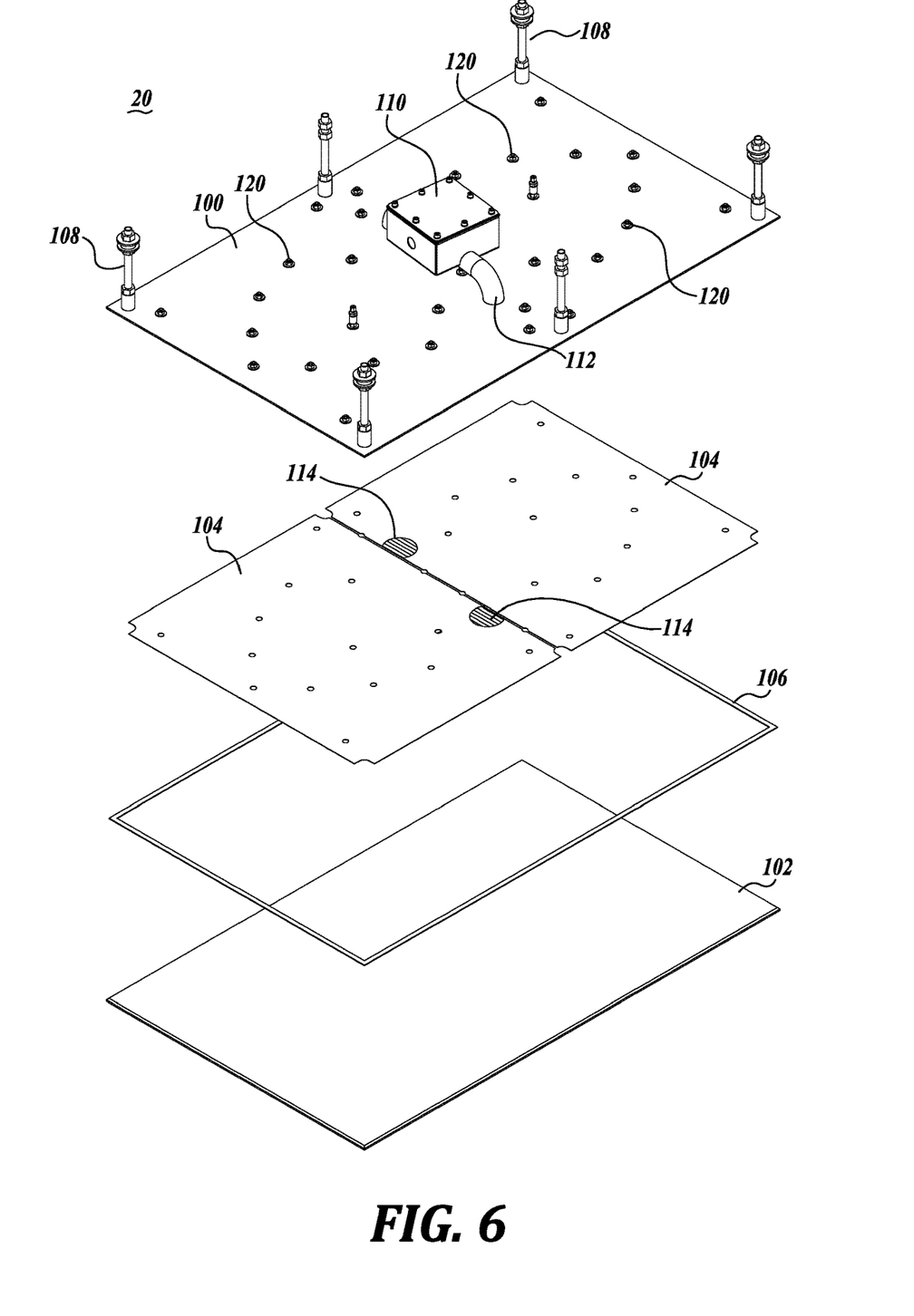
FIG. 6 is an exploded view of FIG. 2.

As shown in FIG. 6, two heating elements 104 are shown as used per heating element assembly 20. It is possible that a single heating element similar to heating elements 104 may be utilized or more than two heating elements employed. This determination may be made, for example, based on the size of the heating element assemblies 20.

To achieve optimal heat transfer from the foil-based heating elements 104 to the outer plates 100, it is helpful if a clamping or pressing force is applied to the heating element so that the foil heating element 104A is pressed tightly against the outer mica layers 104B, which in turn are pressed tightly against the inner surfaces of the outer plates 100 and 102. To this end, a series of substructures in the form of fasteners 120 are located about the area of the heating element assemblies 20.

Figure 7A:
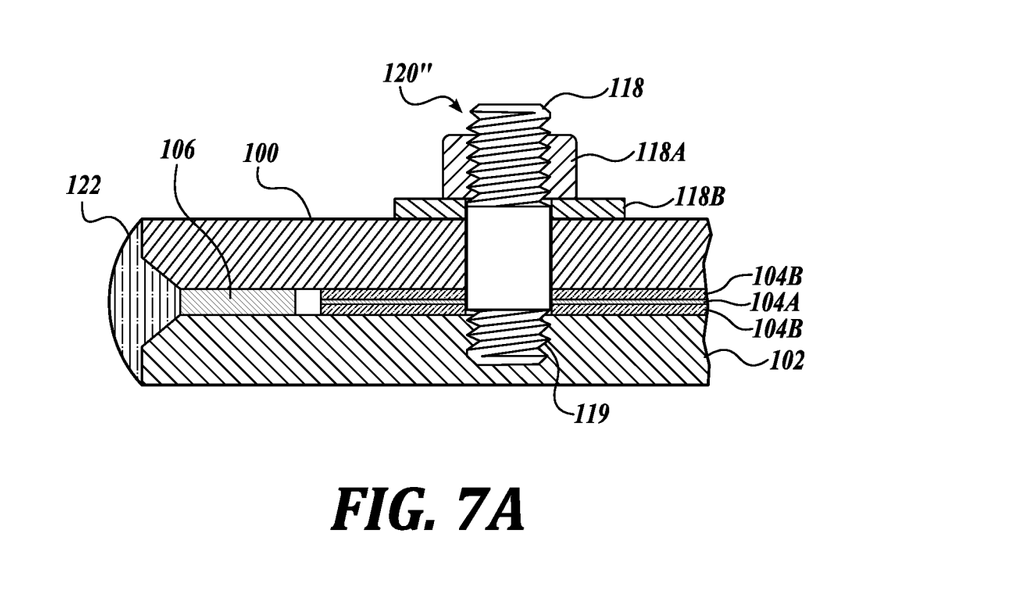
FIG. 7A is an enlarged fragmentary view showing a substructure for applying a clamping load on the heating elements.
Figure 7B:
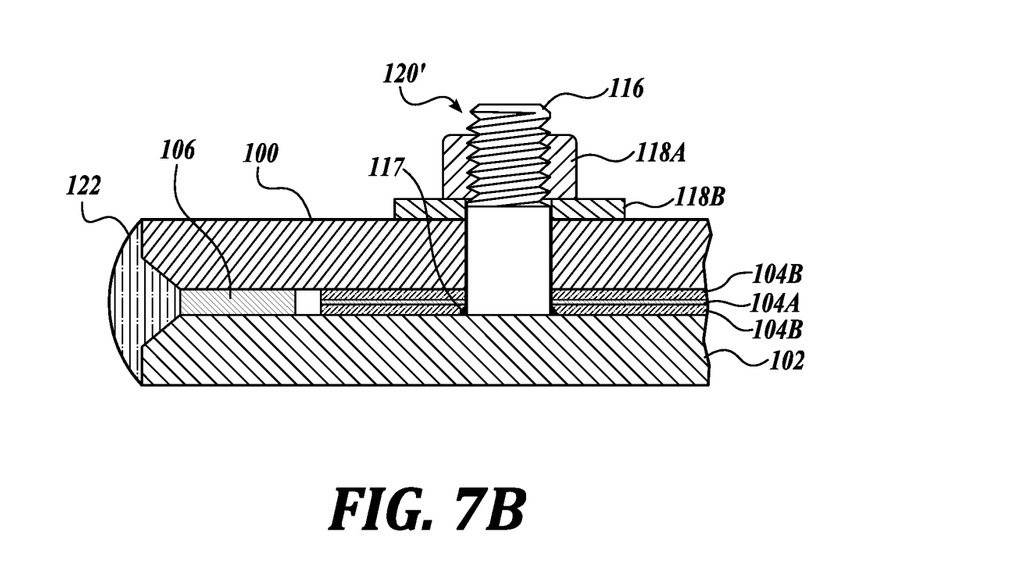
FIG. 7B is an enlarged fragmentary view showing a second substructure for applying a clamping load on the heating elements.

As shown in FIG. 7B, in the illustrated heating element assembly 20; the substructure fasteners can be in the form of threaded pins 116 that are welded to one of the outer plates (plate 102) via weldment 117. The pin 116 extends through clearance holes formed in the heating elements 104 and the other or opposite outer plate (plate 100) to engage a threaded nut 118A or other hardware number. A washer 118B or other similar element can be positioned between the nut 118A and the outer surface of the outer plate 110. In this manner, the outer face of the plate 102 that faces the food product, or other product to be thermally treated, is of solid construction so as to present a sealed construction of the heating element assembly to the food product. This is advantageous, for example, if the heating element assembly 20" is positioned below the lower conveyor belt 16 and drippings from the food product fall onto the heating element assembly. Also, such solid construction helps achieve a uniform level of heat emanating from the entire area of the outer plate (plate 102).

As an option, as shown in FIG. 7A, rather than being welded to the inside surface of the outer plate (plate 100) that faces the food product being thermally treated, a pin 118 can be threaded into threaded blind holes 119 formed in the outer plate 102. The threaded blind holes 119 do not extend through the entire thickness of the outer plate 102, so that the outer plate comprises a sealed construction to the food product being thermally treated.

In heating element assemblies 20' and 20", rather than using nut 118A and washer 118B, the pins 116 and 118 can be welded to the exterior surface of the outer plate 102. Further, a head can be formed on the protruding end of the pins 116 and/or 118 to bear against the outer surface of the outer plate (plate 100).

As a further option, the fasteners 120 can extend through clearance holes formed in both the outer plates 100 and 102 as well as the heating elements 104. The fasteners 120 can be of various types, including screws, bolts, rivets, etc. An appropriate sealant can be used between the outer surfaces of plates 100 and 102 and the fasteners 120 to seal the heating element assembly 20 from the exterior.

Figure 2:
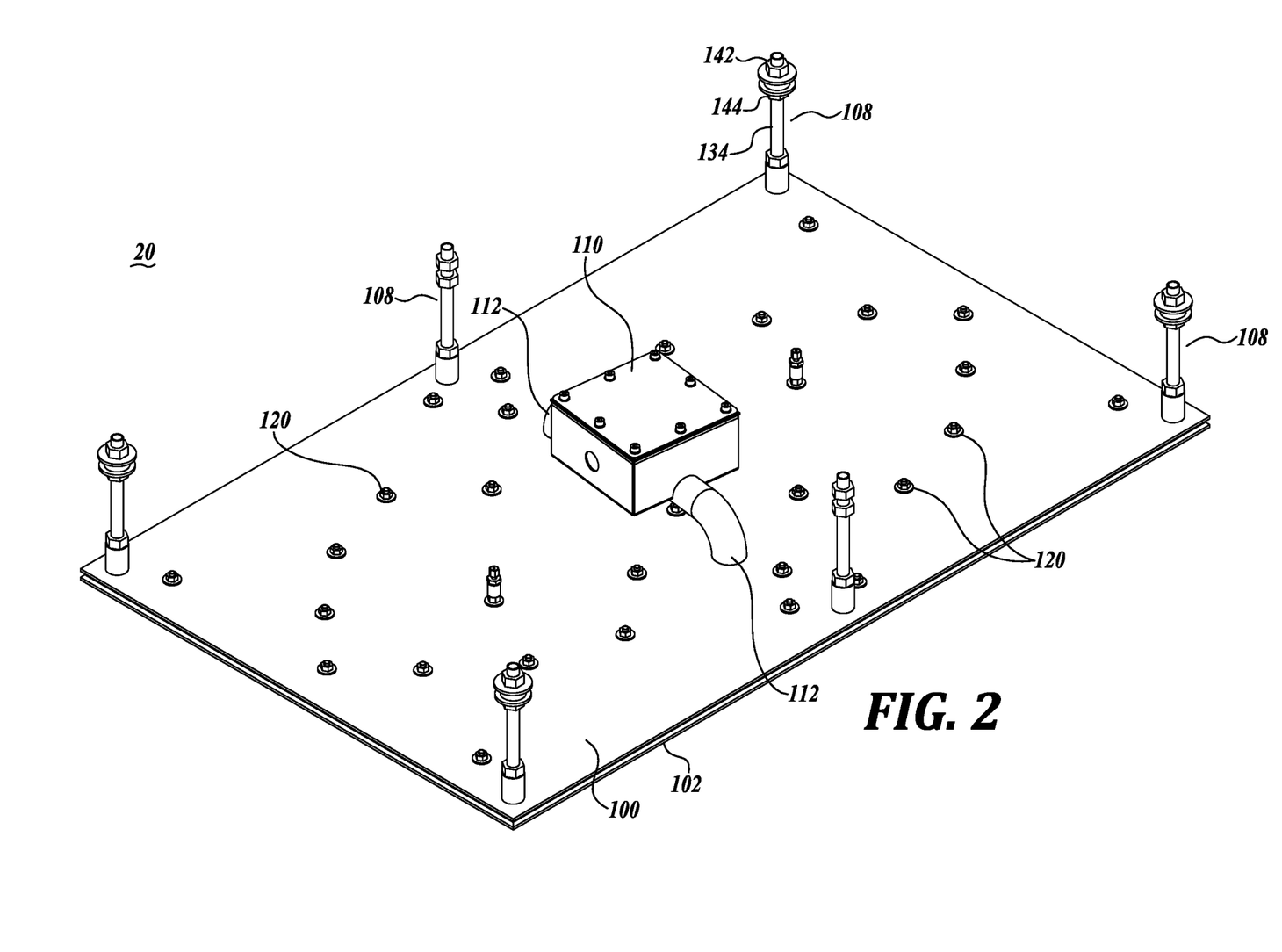
FIG. 2 is a pictorial view of a heating element structure of the present disclosure.
Figure 3:
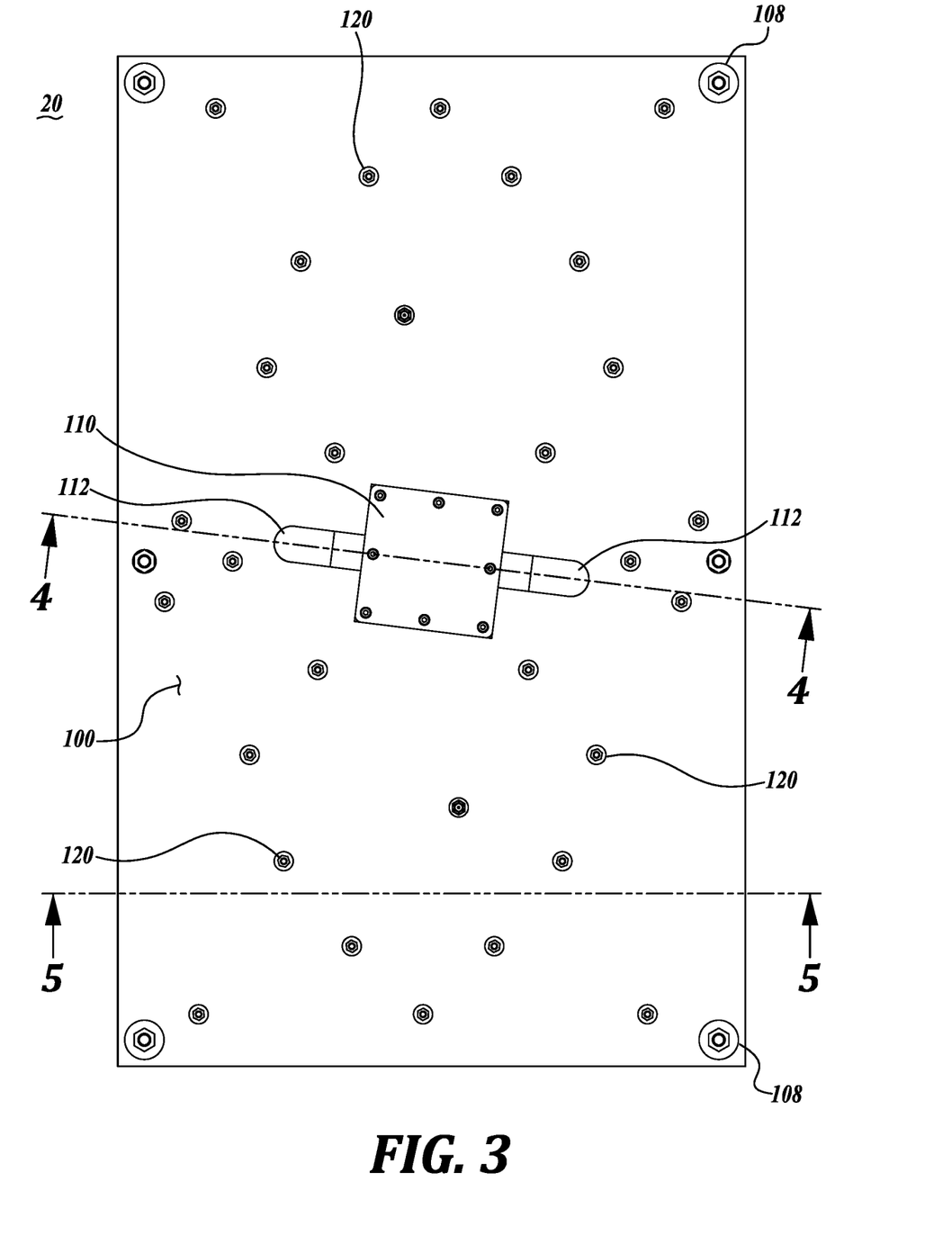
FIG. 3 is a top view of FIG. 2.

As shown in FIGS. 2, 3 and 6, the fasteners 120 are positioned at irregular locations about the area of outer plates 100 and 102 and thus also the heating element(s) 104. The reason for this is to avoid any significant reduction of heat applied to any position across the width in the heating element assembly 20, but still achieve substantially uniform clamping of the heating element 104 between the outer plates 100 and 102. Of course, the irregular pattern of the fasteners 120 shown in FIGS. 2, 3 and 6 can be replaced by other patterns.

A perimeter spacer 106 extends around the perimeter of the heating elements 104, thereby to define a space or thickness for the heating elements. In this regard, the thickness of the spacer 106 corresponds to the thickness of the heating elements 104. Although not shown in FIG. 6, the spacer 106 may include a lateral section extending centrally across the spacer 106 at a location between the heating elements 104.

The separate perimeter spacer may be replaced by a spacer that is integrally formed with one or both of the outer plates. For example, a protrusion or ridge can extend from one of the outer plates toward the opposite outer plate. This protrusion/ridge can be cast into or machined from the inside surface of one or both of the outer plates. The protrusion/ridge can be continuous along the perimeter of the outer plate(s) or intermittent along the perimeter of the outer plate(s).

The outer edge of the heating element assembly 20 is sealed to prevent entry of liquids, moisture, or other contamination, etc., between the outer plates 100 and 102. Such seal can be of various compositions. For example, a weldment 122 can be formed between outer plates 100 and 102 along their perimeters, to the outside of the perimeter spacer 106. Such weldment 122 would provide a permanent, durable seal for the heating element assembly 20. Alternatives to a weldment might include the use of an adhesive caulk or solder.

The weldment 122 could replace the spacer 106 to also function as the spacer to define a thickness space for the heating elements 104. Moreover, the weldment 122 can also serve to press the outer plates against the opposite faces of the one or more heating elements 104.

Figure 4:
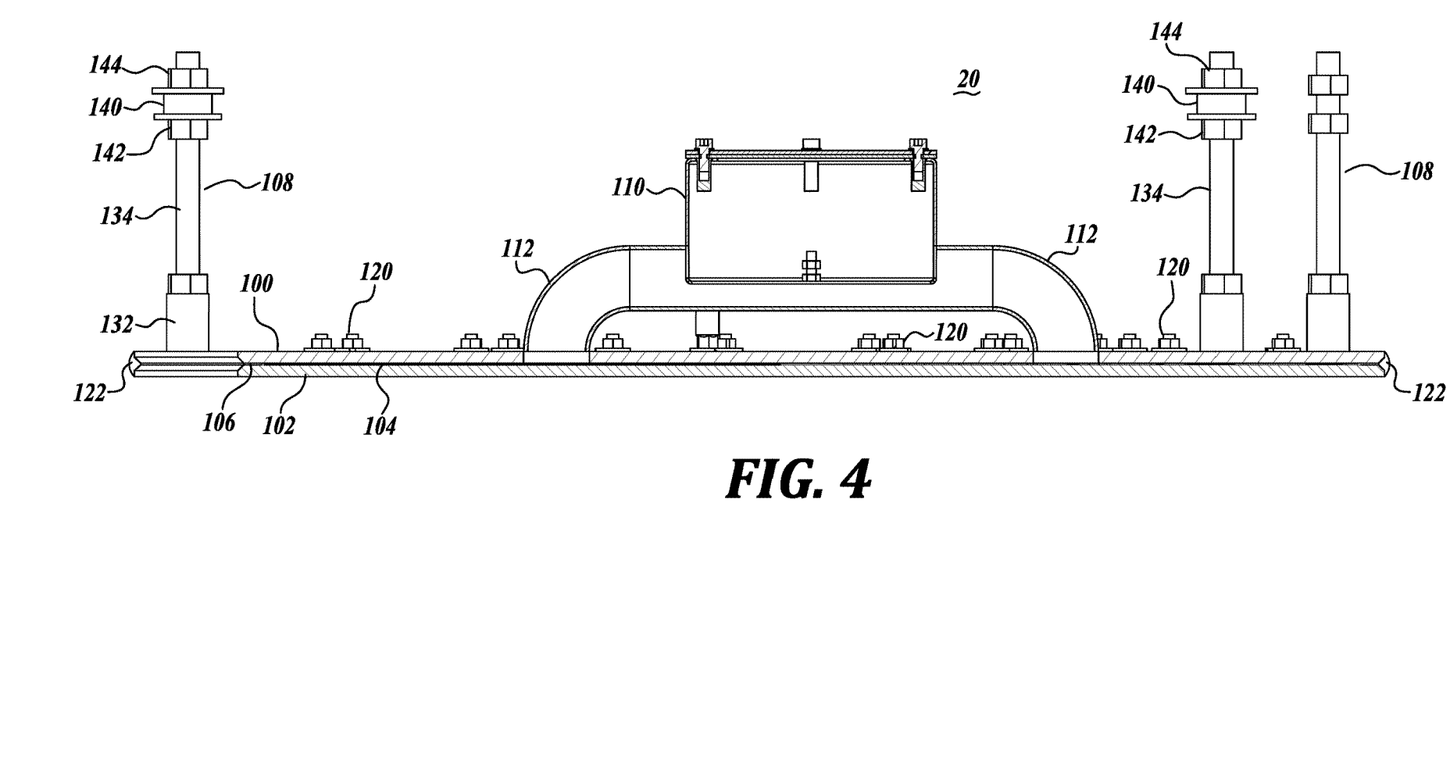
FIG. 4 is a cross-sectional view of FIG. 3 taken along lines 4-4 thereof.
Figure 5:
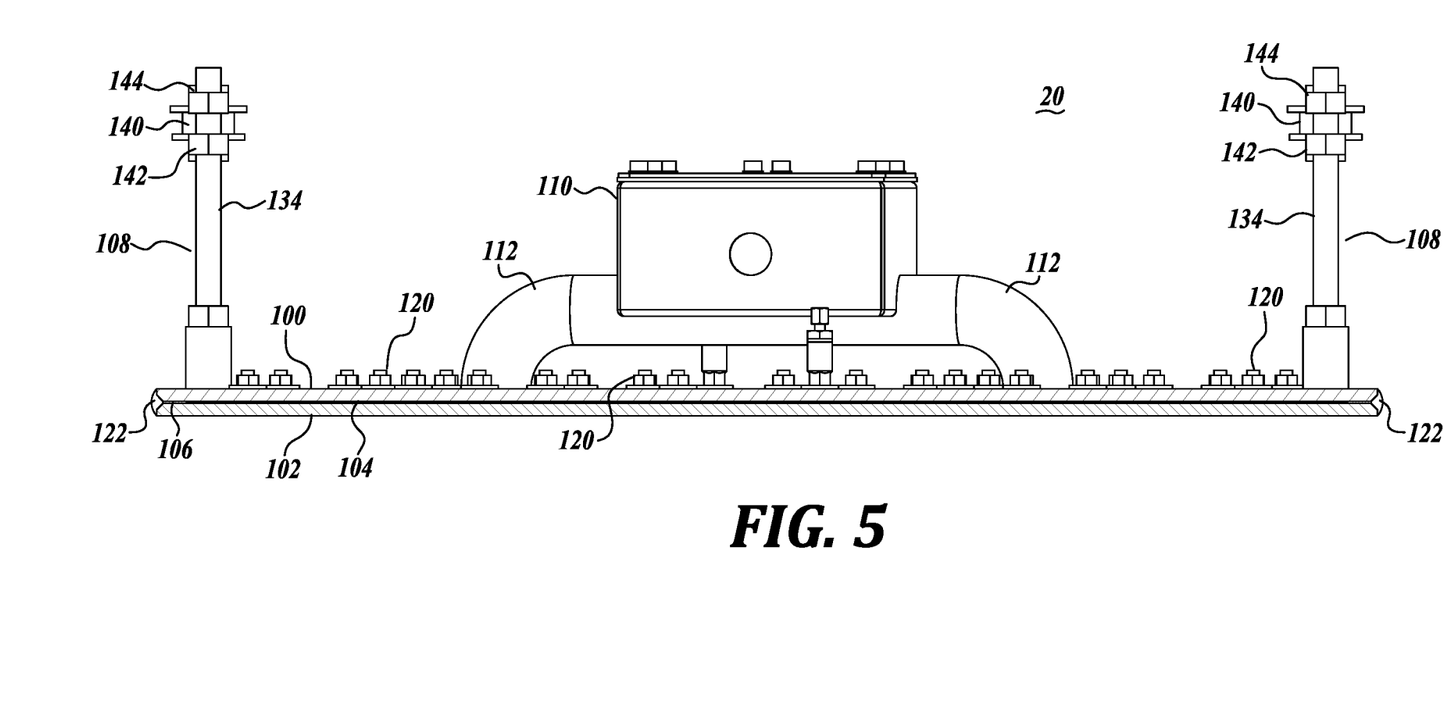
FIG. 5 is a second cross-sectional view of FIG. 3 taken along lines 5-5 thereof.

The heating element assemblies 20 are mounted to the lower and upper frame structures 12 and 14 by a series of mounting brackets in the form of, for example, pin assemblies 108 that project transversely or normally to the outer surface of plates 100, see FIGS. 4-6. The mounting pin assemblies 108 include a threaded bushing 132 having one end fixed to the exterior surface of the outer plate 100 by weldments or other means. In this regard, the bushing 132 extends normally to the exterior of the outer surface plate 100. A threaded stud 134 is threadably engaged within the interior of the bushing 132 to extend outwardly from the bushing. As shown in FIG. 1, the distal end of the studs 134 are connected to fingers 136 that cantilever outwardly from mounting brackets 138, which are mounted to the lower bed frame 22 and upper bed frame 60.

Referring specifically to FIGS. 4 and 5, at the distal end of the mounting pin assembly 108, a bushing 140 is located to be snugly receivable within a close-fitting opening in the distal ends of the fingers 136. First and second threaded nuts 142 and 144 may be adjusted along the length of the threaded stud 134 so as to adjust the position of the outer surfaces of outer plates 102 to be substantially coplanar with the lower surface of conveyor belt 16 along the upper run of the belt, as well as coplanar with the upper surface of conveyor belt 18 along the lower run of the conveyor belt so as to achieve optimum heat transfer from the heating element assemblies 20 to the conveyor belts.

Of course, other means can be utilized to mount the heating element assemblies 20 to the frame structures 12 and 14 other than described above or shown in the drawings. Also, although the drawings illustrate a total of six mounting pin assemblies 108 for the heating element assembly, the number of mounting pin assemblies may be increased or decreased as desired or needed depending on various factors, for example, the size of the heating element assemblies 20.

The conveyor belts 16 and 18 are constructed from a material capable of conveying food products without damage thereto and also, with minimal adherence to the food product especially in raw or uncooked form. The conveyor belts are also capable of efficiently transferring cooking heat from the heating element assemblies 20 to the food products to be cooked. One such material that adequately meets this criterion is polytetrafluoroethylene, typically used as an exterior coating of belt substrate composed of, for example, fiberglass or similar material.

It will be appreciated by the foregoing description that the present disclosure provides an efficient and highly durable belt cooking apparatus 10 that is capable of sufficiently generating high levels of cooking heat that is uniform across the width of the conveying belts as well as along the length of the conveyor belts. Moreover, the heating element assemblies are of a straightforward configuration, thereby efficient to manufacture as well as readily installable on a belt cooking apparatus 10. Further, the heating element assemblies 20 occupy a minimum of space which facilitates their installation on the belt cooking apparatus 10.

While illustrative embodiments have been illustrated and described, it will be appreciated that various changes can be made therein without departing from the spirit and scope of the invention. For example, a thermal/heat grease, paste or adhesive may be applied between the inner surfaces of the outer plates 100 and 102 and the heating element 104 to enhance or facilitate heat transfer from the heating element 104 to the outer plates 100/102. The use of thermal/heat grease, paste and/or adhesive may reduce the number of fasteners 120 needed to clamp the heating element assembly together. Thermal/heat grease and adhesives are articles of commerce and may utilize aluminum oxide, boron nitride, zinc oxide and aluminum nitride as heat conducting agents.

Also, clamping substructures other than described above; it can be used to clamp the heating element(s) between the outer plates, including magnetically or electromagnetically based systems.

The embodiments of the invention in which an exclusive property or privilege is claimed are defined as follows:

1. A heating element assembly for mounting on a belt food cooking apparatus adjacent a moving conveyor for cooking food products while carried on the moving conveyor, the heating element assembly comprising:
   first and second heat conducting planar outer plates composed of corrosion resistant material, the first and second heat conducting outer plates having outside surfaces and corresponding inside surfaces, the first and second heat conducting outer plates positioned to expose the outside surfaces of the outer plates to food products to be cooked and the first and second heat conducting planar outer plates forming an exterior of the heating element assembly;
   one or more nominally planar foil-based heating elements sandwiched between the first and second outer plates;
   a clamping force pressing against the first and second heat conducting outer plates to clamp the one or more foil-based elements between and against the inside surfaces of the first and second outer plates;
   a spacer structure disposed between the first and second outer plates to space the first and second outer plates apart from each other when under the clamping force to accommodate a thickness of the one or more foil-based heating elements;
   a mounting structure for mounting the heating element assembly to position the first or second outer plate adjacent the food products to be cooked while being carried on the conveyor, said mounting structure comprising mounting bracket assemblies projecting from one or both of the first and second outer plates for mounting one of the outer plates in a desired position adjacent and exposed to the food products to be cooked; and
   wherein the one or more nominally planar foil-based heating elements each consists of an etched foil center layer disposed between dielectric layers, the dielectric layers disposed against the inside surfaces of the first and second heat conducting planar outer plates.

2. The heating element assembly according to claim 1, wherein the first and second outer plates have a length in the range of about 900 mm to 1200 mm and have a width in the range of about 400 mm to 700 mm.

3. The heating element assembly according to claim 1, wherein the first and second outer plates have a thickness of about 4 mm to about 10 mm.

4. The heating element assembly according to claim 1, wherein the first and second outer plates are composed of stainless steel.

5. The heating element assembly according to claim 1, further comprising a substructure to position the first and second outer plates against outer faces of the one or more foil-based heating elements.

6. The heating element assembly according to claim 5, wherein the substructure comprises fasteners extending through a thickness of at least one of the first and second outer plates and through the foil-based heating element(s) to apply the clamping load on the foil-based heating element.

7. The heating element assembly according to claim 6, wherein the fasteners are adjustable to adjust the clamping load applied to the foil-based heating element(s).

8. The heating element assembly according to claim 6, wherein the fasteners are anchored to one of the first and second outer plates and extend through the thickness of the heating element(s) and the other outer plate.

9. The heating element assembly according to claim 8, wherein the fasteners are threaded or welded to the first or second outer plate.

10. The heating element assembly according to claim 5, wherein the substructure comprises a weldment extending along an outer perimeter of the first and second outer plates.

11. The heating element assembly according to claim 1, wherein the spacer structure extends along a perimeter of the outer plates outward of the foil-based heating element(s).

12. The heating element assembly according to claim 11, further comprising a seal to seal the spacer structure from the exterior of the heating element assembly.

13. The heating element assembly according to claim 12, wherein the seal comprises a weldment.

14. The heating element assembly according to claim 1, wherein the spacer structure defines a gap between the first and second outer plates corresponding to the thickness of the foil-based heating element.

15. The heating element assembly according to claim 14, further comprising a seal to seal the gap between the first and second outer plates from the exterior of the heating element assembly.

16. The heating element assembly according to claim 15, wherein the seal is a weldment.

17. The heating element assembly according to claim 1, wherein the spacer structure comprises a weldment extending along perimeters of the first and second outer plates.

18. The heating element assembly according to claim 1, wherein the spacer structure is structurally integral with one or both of the first and second outer plates.

19. The heating element assembly according to claim 1, wherein the spacer structure extends from one outer plate toward the other outer plate.

20. The heating element assembly according to claim 1, wherein the mounting bracket assemblies comprise pin assemblies projecting laterally from one of the first and second outer plates, the pin assemblies mountable with hardware members to adjust the position of the outside surface of the outer plate from which the pin assemblies project relative to the moving conveyor.

21. The heating element assembly according to claim 1, further comprising a heat conducting paste or a heat conducting adhesive disposed between the one or more foil-based heating elements and one or both of the first and second outer plates.

22. A cooking apparatus comprising a plurality of heating element assemblies constructed according to claim 1 and disposed adjacent a moving conveyor.

23. A belt cooking apparatus having a lower cooking conveyor belt and an upper cooking conveyor belt disposed above the lower cooking belt and a heating element assembly mounted just below the lower cooking belt and a heating element assembly mounted just above the upper cooking belt for cooking food products while carried by the upper and lower conveyor belts, the heating element assemblies comprising:
   first and second heat conducting planar outer plates composed of corrosion resistant material to form an exterior of the heating element assembly, the first and second heat conducting plates having outside surfaces and corresponding inside surfaces, the first and second heat conducting plates positioned to expose the outside surfaces to food products to be cooked through the upper and lower cooking conveyor belts;

one or more nominally planar foil-based heating elements sandwiched between the first and second outer plates;

a clamping force pressing against the first and second heat conducting planar outer plates to clamp the one or more foil-based elements between the inside surfaces of the first and second planar outer plates;

a mounting structure for mounting the heating element assemblies just below the lower cooking belt and just above the upper cooking belt, said mounting structure comprising mounting bracket assemblies projecting from one or both of the first and second outer plates for mounting the heating element assemblies; and wherein the one or more nominally planar foil-based heating elements each consists of an etched foil center layer disposed between dielectric layers, the dielectric layers disposed against the inside surfaces of the first and second heat conducting planar outer plates.

* * * * *